United States Patent
Aitken et al.

(10) Patent No.: US 7,612,004 B2
(45) Date of Patent: Nov. 3, 2009

(54) HIGH STRAIN POINT GLASSES

(75) Inventors: Bruce G. Aitken, Corning, NY (US); Matthew J. Dejneka, Corning, NY (US); Adam J. G. Ellison, Painted Post, NY (US); Thomas E. Paulson, Groveland, IL (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 11/505,205

(22) Filed: Aug. 16, 2006

(65) Prior Publication Data

US 2007/0042894 A1    Feb. 22, 2007

Related U.S. Application Data

(60) Provisional application No. 60/709,337, filed on Aug. 17, 2005.

(51) Int. Cl.
   *C03C 3/095*  (2006.01)
   *C03C 3/068*  (2006.01)
(52) U.S. Cl. ............... 501/64; 501/73; 501/78
(58) Field of Classification Search ........... 501/64, 501/73, 78
   See application file for complete search history.

(56) References Cited

U.S. PATENT DOCUMENTS

| | | | | |
|---|---|---|---|---|
| 2,805,166 A | 9/1957 | Löffler | ............... | 106/47 |
| 3,338,696 A | 8/1967 | Dockerty | ............... | 65/145 |
| 3,682,609 A | 8/1972 | Dockerty | ............... | 65/83 |
| 4,798,768 A * | 1/1989 | Oversluizen et al. | ........ | 428/426 |
| 5,854,151 A * | 12/1998 | Fukuoka | ............... | 501/68 |
| 6,555,232 B1 * | 4/2003 | Aitken et al. | ............... | 428/428 |
| 7,262,466 B2 * | 8/2007 | Aitken et al. | ............... | 257/347 |
| 7,473,969 B2 * | 1/2009 | Aitken et al. | ............... | 257/347 |
| 2004/0235636 A1 | 11/2004 | Tsai et al. | ............... | 501/64 |
| 2006/0038227 A1 * | 2/2006 | Aitken et al. | ............... | 257/347 |
| 2006/0038228 A1 * | 2/2006 | Aitken et al. | ............... | 257/347 |
| 2007/0191207 A1 | 8/2007 | Danielson et al. | | |

FOREIGN PATENT DOCUMENTS

| | | |
|---|---|---|
| EP | 0 953 548 | 11/1999 |
| JP | 62-138342 | 6/1987 |
| JP | 2002-255585 | 9/2002 |
| SU | 341764 * | 6/1972 |
| SU | 471318 * | 9/1975 |

\* cited by examiner

*Primary Examiner*—Karl E Group
(74) *Attorney, Agent, or Firm*—Thomas R. Beall; Lawrence A. Villanueva

(57) ABSTRACT

A family of glasses from the rare earth alumino-silicate ($RE_2O_3$—$Al_2O_3$—$SiO_2$) ternary system exhibiting high strain point and low liquidus temperatures; preferably the $La_2O_3$—$Al_2O_3$—$SiO_2$ ternary system. The glasses are excellent candidates for electronics applications and have the following composition, expressed in mole percent and calculated from the glass batch on an oxide basis: 60-85% $SiO_2$, 10-25% $Al_2O_3$, and 4-15% $RE_2O_3$.

23 Claims, 2 Drawing Sheets

HIGH STRAIN POINT GLASSES

CROSS-REFERENCE TO RELATED APPLICATIONS

This application claims the benefit of U.S. application Ser. No. 60/709,337 filed on Aug. 17, 2005 and entitled "High Strain Point Glasses" which is incorporated by reference herein in.

FIELD OF THE INVENTION

The invention relates to rare earth aluminosilicate ($RE_2O_3$—$Al_2O_3$—$SiO_2$) glasses that are characterized by a high strain point and a relatively low liquidus temperature.

BACKGROUND OF THE INVENTION

The materials of the present invention are most importantly substrate candidates for electronic devices. Several processes in the manufacture of electronic devices such as liquid crystal displays (LCDs), solar cells, electronics, microelectronics etc. include steps that are performed at extremely high temperatures. For example, active matrix LCDs employ an active device such as a diode or thin film transistor at each pixel thereby enabling high contrast and high response speed. Although many display devices currently utilize amorphous silicon (a-Si), the processing of which may be accomplished at temperatures under 450° C., polycrystalline-silicon (poly-Si) processing is preferred. Poly-Si has a much higher drive current and electron mobility thereby increasing the response time of the pixels. Further, it is possible, using poly-Si processing, to build the display drive circuitry directly on the glass substrate. By contrast, a-Si requires discrete driver chips that must be attached to the display periphery utilizing integrated circuit packaging techniques. The most efficient poly-Si processing methods operate at temperatures of at least 730° C., such processes enable formation of poly-Si films having extremely high electron mobility (for rapid switching) and excellent TFT uniformity across large areas. This fabrication process typically consists of successive deposition and patterning of thin films using elevated temperature processes which result in the substrate being heated to temperatures in the range of 650° C. or higher. Common commercial LCD glasses (e.g. Corning 1737 and Corning Eagle) exhibit strain points of approximately 670° C. Fused silica has a sufficiently high strain point of 990-1000° C., but its coefficient of thermal expansion (C.T.E.) of $5\times10^{-7}$/° C.) is significantly lower than that of silicon which has a C.T.E. of $37\times10^{-7}$/° C.) which can lead to high stress and failure. Further, the cost associated with formed fused silica substrates suitable for electronic devices is a deterrent. The strain point of most LCD glasses can be increased by lowering the modifier content of the glass and increasing the silica content, but this also raises the temperature required to melt and fine the glass to a high quality melt. This temperature is often referred to as the 200 Poise temperature or $T_{200P}$. Thus generally, the higher the strain point, the higher the $T_{200P}$, which accelerates corrosion of the refractories, increases energy consumption, and the overall cost, so there is often a tradeoff between strain point and meltability.

For other electronic devices, common processing steps also require high temperature substrates to withstand processing. Most high level electronic fabrication requires annealing of the gate oxide and dopant activation. These processes occur at temperatures in excess of 650° C.

Even in the case of single crystal silicon (x-Si) fabrication techniques that employ a thin layer of single crystal silicon bonded to a substrate, high temperature substrates are required. Single crystal silicon allows for even greater electron mobility than that achieved with poly-Si. The bonding step often requires high temperatures as well as the gate oxide and dopant activation steps previously described.

Liquidus viscosity also plays a major role in glass selection for substrate candidates. Lower liquidus temperatures translate into higher liquidus viscosities. These high viscosities allow for a large selection of commercially relevant forming techniques such as downdraw techniques. One particular example of a downdraw technique is known as the overflow downdraw or fusion sheet manufacturing process. The overflow downdraw process is described in U.S. Pat. No. 3,338,696 and U.S. Pat. No. 3,682,609. Glasses with low liquidus temperatures, allowing for high viscosities in the forming apparatus, are therefore good candidates for downdraw manufacturing processes. Lower liquidus temperature glasses also have the advantage of causing less corrosion on the refractory materials used in the forming processes. This translates into longer life for the forming apparatus, while a glass with a low melting and fining temperature ($T_{200P}$) increases tank life.

A need exists, then, for a glass that (1) has a high strain point (>650° C.), (2) does not require costly heat treatments after fabrication, (3) has a CTE close to that of silicon, and (4) can be melted in a conventional melting unit ($T_{200P}$<1650° C.) and formed according to a commercially proven method. In addition, the glass will preferably be transparent to visible radiation and be chemically durable. These several qualities are needed in glasses for production of such varied products as flat panel displays, photovoltaic cells, photomasks, optomagnetic disks and tubing and fiber applications that require stability at high temperatures.

A primary purpose of the present invention is to provide an alkali-free glass that has properties suited to production of a poly-Si or x-Si coating on its surface.

Another purpose is to produce a glass having a sufficiently high strain point to permit processing at temperatures in excess of 650° C.

A further purpose is to provide a glass that can be melted and formed by conventional procedures, and that can provide a substrate for application of a high quality, poly-Si or x-Si film.

A still further purpose is to provide an electronic device, in particular, a flat panel display, and having a high-quality, poly-Si or x-Si, thin film on its surface.

Another purpose is to provide a novel glass family consisting essentially of $RE_2O_3$—$Al_2O_3$—$SiO_2$, with RE comprising a rare earth, and optionally containing selected oxides such as alkali, alkaline earth, and transition metal oxides.

SUMMARY OF THE INVENTION

The invention resides in part in the rare earth aluminosilicate ($RE_2O_3$—$Al_2O_3$—$SiO_2$) system of glasses exhibiting, a strain point in excess of 650° C. and preferably in excess of 730° C., a liquidus temperature of 1300° C. or less, $T_{200P}$ of approximately 1500° C. or less, and liquidus viscosities favorable for a variety of forming processes.

The invention further resides in an electronic device having a poly-silicon film on a transparent, glass substrate, the substrate being a rare earth-aluminosilicate glass having an $RE_2O_3$ content of 4-15 mol percent, and a strain point in excess of 730° C. The rare earth (RE) being selected from the group consisting of Sc, Y, La, Ce, Pr, Nd, Sm, Eu, Gd, Tb, Dy, Ho, Er, Tm, Yb, Lu and mixtures thereof. In a preferred embodiment the rare earth comprises lanthanum.

DESCRIPTION OF THE INVENTION

Figure 1:
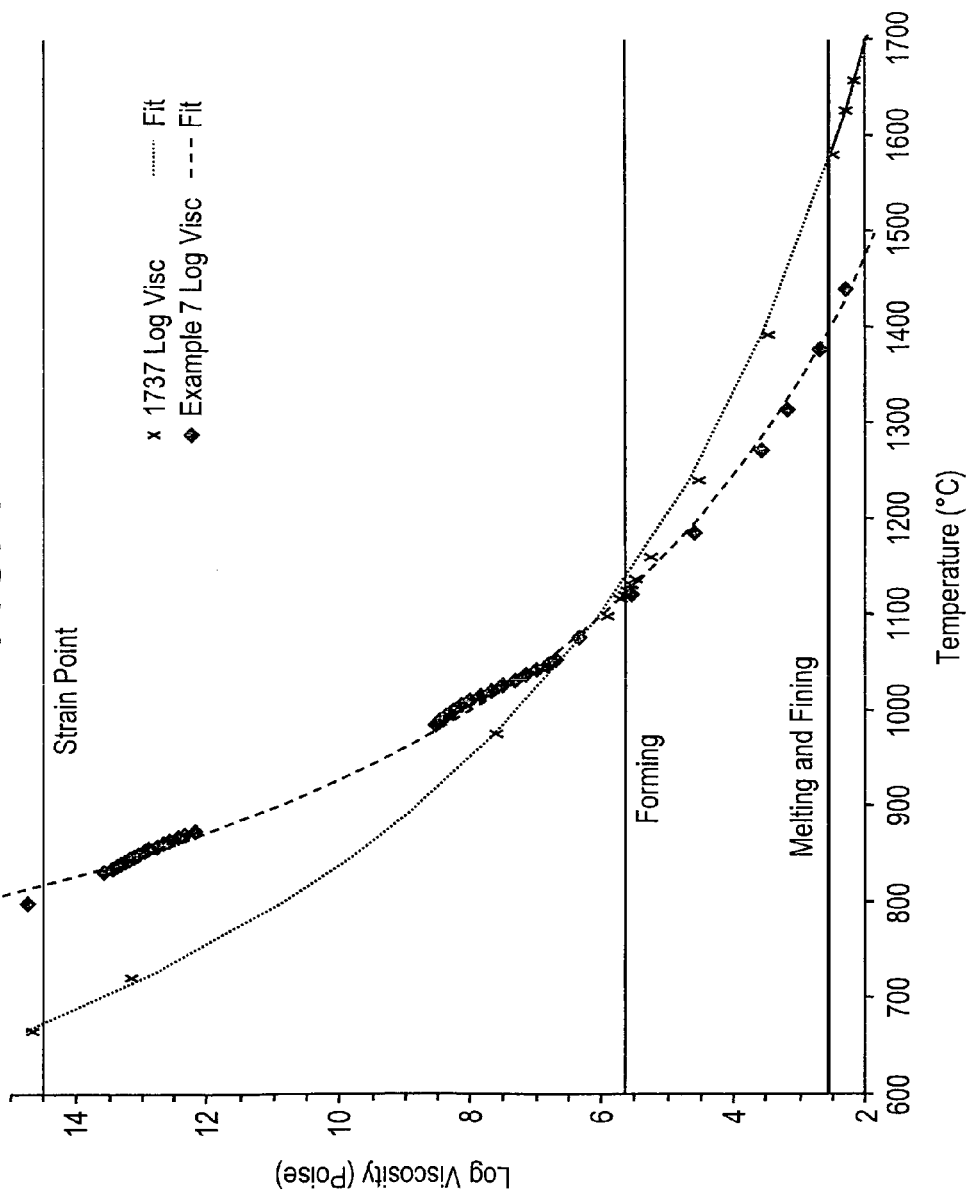
FIG. 1 is a viscosity curve demonstrating the viscosity of a glass of the present invention compared to a commercially available display substrate glass.

Broadly stated, the present alkali-free glasses have compositions falling within the following ranges, expressed in mole % as calculated from the glass batch on an oxide basis:

| | |
|---|---|
| $SiO_2$ | 60-88% |
| $Al_2O_3$ | 10-20% |
| $RE_2O_3$ | 2-15% |
| RO | 1-12% |

$SiO_2$ serves as the major network-forming component of the glass. When the $SiO_2$ content falls below 60 mole percent, chemical resistance is adversely affected and strain point is lowered and the CTE raised to unacceptable levels. When the $SiO_2$ level surpasses 85%, the liquidus and melting temperatures are raised to levels not compatible with accepted sheet glass manufacturing methods.

$Al_2O_3$ as a glass component serves to further stabilize the glass network, especially in the presence of network-modifying components, enhancing heat and devitrification resistance of glass. When the level of $Al_2O_3$ drops below 10 mole percent, devitrification readily occurs in the glass. If the glass contains greater than 25 mole percent $Al_2O_3$, the liquidus exceeds 1300° C. and the glass becomes subject to acid degradation. In on aspect, the amount of $Al_2O_3$ ranges from 10-20 mol %. In another aspect, the amount of $Al_2O_3$ ranges from 10.6-20 mol %.

As demonstrated in the present invention, $RE_2O_3$ as a glass component has been shown to maintain the high strain point of the base aluminosilicate glass while reducing the liquidus and $T_{200P}$ temperatures. As the $RE_2O_3$ content decreases, the glass becomes too refractory for conventional melting and forming practices for high strain point compositions. Too much $RE_2O_3$ could decrease strain point and raise CTE. As a general rule, the total amount of modifying oxides (including preferably $La_2O_3$) should not exceed the amount of alumina in order to maintain the structural integrity of the glass network and, hence, the desired high strain point. The best properties (low CTE and liquidus temperature) are usually obtained when the modifier to alumina ratio given by $(RO+ 1.5*RE_2O_3)/Al_2O_3$ is close to 1 and between 0.85 and 1.2 depending on the makeup of the alkaline earth oxides, where RE (rare earth) is selected from the group defined as Sc, Y, La, Ce, Pr, Nd, Sm, Eu, Gd, Tb, Dy, Ho, Er, Tm, Yb, and Lu. In one aspect, the amount of $RE_2O_3$ ranges from 2-15 mol %. In another aspect, the amount of $RE_2O_3$ ranges from 2-12.49 mol %.

Any number of fluxes (e.g. modifying oxides) may be added to the batch in order to impart desired characteristics. While these fluxes may lower the strain point of the native glass, they are often necessary for any or all of the following purposes: raise the CTE, lower the liquidus temperature, obtain a preferred strain point for compaction, absorption at specific wavelengths, facilitate melting, modify density, or modify durability. The effects that certain oxides have on the physical and chemical characteristics of glass are generally known. For example, $B_2O_3$ is a component that serves to lower viscosity and facilitate melting. Addition of MgO and/or CaO is known to decrease liquidus temperature without significantly lowering strain point when balanced by an equivalent $Al_2O_3$ addition. Likewise BaO and/or SrO are also valuable for lowering the liquidus and are known to improve the chemical resistance of glass and improve resistance to devitrification but tend to increase the CTE faster than MgO or CaO. ZnO is known to enhance resistance to buffered hydrofluoric acid as well as resistance to devitrification. $As_2O_3$, $Sb_2O_5$, $CeO_2$, $SO_3$, $SnO_2$, halides and other known fining agents may be added to the batch to reduce bubbles in the glass.

Fluxes in the form of modifying oxides, represented by RO may be added in amounts up to 20% or as limited by solubility. Preferably fluxes are added in amounts less then 15 mole percent. In one aspect, RO ranges from 1 to 12 mol %. Modifying oxides may be selected from those of alkali metals, alkaline earth metals, transition metals as well as oxides of the lanthanide series. Specific examples include, $ZrO_2$, $HfO_2$, MgO CaO, SrO, BaO, $As_2O_3$, $SnO_2$, $GeO_2$, $Ga_2O_3$, $Sb_2O_3$, $P_2O_5$ and/or $B_2O_3$. In one aspect, the modifying oxide is $B_2O_3$ ranging from 0 to 9 mol %. In another aspect, the modifying oxide is $SnO_2$ ranging from 0 to 2 mol %. For preferred embodiments, R shall be the alkaline earth elements Mg, Ca, Sr, or Ba. In this aspect, RO ranges from 1 to 12 mol %, wherein R is an alkaline earth metal selected from the group consisting of Mg, Ca, and Sr; or when R is Ba, at least one additional alkaline earth metal selected from the group consisting of Mg, Ca, and Sr is present.

It should be noted that for glasses used for flat panel display devices, modifying oxides are preferred. However, modifying with nitrides such as AlN, or modifying with halogens such as F$^-$, alone or in combination with modifying oxides may be acceptable for particular applications. In such event, the total modifier content should still not exceed 20 mole percent and preferably be less than 15 mole percent. Likewise, although it is preferred for glasses that used as substrates for LCD displays be free alkali-free, this limitation may not be critical for other applications and the invention is therefore not to be interpreted as limited to alkali-free glasses.

Preferably, the glasses of the present invention have the following characteristic properties:

| | |
|---|---|
| Strain Point | >730° C. |
| CTE | 25-50 × 10$^{-7}$/° C. |
| Liquidus T | <1300° C. |
| $T_{200P}$ | <1600° C. |
| Liquidus Viscosity | >10,000 poise |

Even more preferred ranges include glasses exhibiting strain points in excess of 750° C., 775° C., and 800° C.; liquidus temperatures less than 1250° C., 1200° C., and 1150° C.; 200 poise temperatures less than 1550° C., 1500° C. and 1475° C.; and, liquidus viscosities in excess of 50,000 poise, 100,000 poise, and 200,000 poise.

A preferred embodiment has compositions within the above identified ranges, again in mol % on an oxide basis, as calculated from the glass batch:

| | |
|---|---|
| SiO$_2$ | 60-75% |
| Al$_2$O$_3$ | 15-20% |
| RE$_2$O$_3$ | 4-15% |
| RO | <10% |

TABLES I and II, below, set forth several compositions, in mol % on an oxide basis, illustrative of compositional ranges of the invention. The actual batch ingredients may comprise any materials, either oxides or other compounds, which when melted together with the other batch components, will be converted into the desired oxide in the proper proportions.

The batch ingredients were compounded, tumble mixed together thoroughly to aid in producing a homogeneous melt, and charged into platinum crucibles. After placing lids thereon, the crucibles were moved into furnaces operating at temperatures of between 1450 and 1650° C. The crucibles were then removed after approximately 4 to 16 hours and poured onto a steel mold. The glass patty was then removed from the mold and placed into an annealing furnace at a temperature slightly above the annealing point of the glass. The glasses were then cooled in the annealing furnace and removed.

Several relevant observations are noted from the numerous glasses listed in Table 1, for example, the first 7 glasses (Examples 1-7) show that replacing Y$_2$O$_3$ with La$_2$O$_3$ lowers the liquidus temperature by approximately 150° C., which increases liquidus viscosity by a factor of 100. In turn, the strain point is only decreased by about 45° C. The increased liquidus viscosity makes the glasses easier to form and allows for greater options in manufacturing including slot drawn and fusion forming techniques. The CTE and density also increase with La$_2$O$_3$ for Y$_2$O$_3$ as expected from the lower field strength and larger mass of La relative to Y. The lowest observed liquidus temperature was obtained near 70 SiO$_2$-18 Al$_2$O$_3$-12 La$_2$O$_3$ (7) at 1210° C., which is the eutectic between cristobalite, mullite and lanthanum pyrosilicate (La$_2$Si$_2$O$_7$).

The next 29 glasses in sequence (7-36) show the effect of varying the SiO$_2$, Al$_2$O$_3$ and La$_2$O$_3$ contents at 3 different levels of Y$_2$O$_3$ (0, 1 and 3 mole %). The results show that the 70 SiO$_2$-18 Al$_2$O$_3$-12 La$_2$O$_3$ (7) composition remains optimal in that Y$_2$O$_3$ increases the liquidus temperature in all composition tested, indicating that La$_2$O$_3$ is more effective in suppressing the crystallization of mullite and/or cristobalite than Y$_2$O$_3$.

The next 44 composition examine the effects of various additional oxides to the "eutectic glass" (7). Most additions had little to no effect on lowering the liquidus temperature. However, B$_2$O$_3$, MgO and F additions all lowered the liquidus temperature. As shown, the addition of 3 mole % MgO (74) appears to provide an optimal effect on depressing liquidus temperature (1180° C.), resulting in a corresponding increased liquidus viscosity of 24,000 poise. This glass is easy to melt, exhibiting a 1425° C. 200 poise temperature. The strain point, although lowered by the addition of MgO, is still 784° C.

Table II further displays the effects of varying amounts of oxides have on glass properties. The first 36 glasses in Table II show mixtures of the 70 SiO$_2$-18 Al$_2$O$_3$-12 La$_2$O$_3$ "eutectic glass" with 2 eutectic compositions in each of the alkaline earth aluminosilicate systems. The high silica cristobalite-mullite-feldspar eutectic composition was chosen as a first end member since it offers the highest strain point and viscosity and lowest CTE for a glass-forming composition in the RO—Al$_2$O$_3$—SiO$_2$ system. The more alkaline earth rich cristobalite-feldspar-alkaline earth silicate eutectic composition was chosen as a second end member since it may provide a lower liquidus temperature at the possible expense of lower strain point and higher CTE. The first 5 glasses in each alkaline earth series are mixes of the 70 SiO$_2$-18 Al$_2$O$_3$-12 La$_2$O$_3$ "eutectic glass" with the cristobalite-mullite-feldspar (first) eutectic composition and the last 4 glasses of each set are mixtures of the 70 SiO$_2$-18 Al$_2$O$_3$-12 La$_2$O$_3$ "eutectic glass" with the cristobalite-feldspar-alkaline earth silicate (second) eutectic composition. The data show that small additions of the first eutectic composition can lower the liquidus temperature from about 1215° C. (90) to 1200° C. or less, with BaO being the most effective and lowering the liquidus temperature to 1195° C. It is also surprising that the heavier alkaline earth ions do not degrade the strain point at all, while lighter MgO and CaO do. Unfortunately the heavier alkaline earths such as BaO also cause the largest increase in CTE as shown in Table II. Thus a mixture of alkaline earths provide the best combination of decreased liquidus temperature and improved properties.

The next 2 glasses (117) and (118) show how nitriding the glass can increase its strain point from 805 to 826° C. with additions of AlN which has the added benefit of decreasing CTE as well, but could be problematic for Pt lined melters which can be susceptible to melting if the Pt has ever been exposed to polyvalent and reducible ions.

122-124 show how higher levels of B$_2$O$_3$ quickly degrade the strain point without any beneficial impact on liquidus temperature for the 70 SiO$_2$-18 Al$_2$O$_3$-12 La$_2$O$_3$ "eutectic glass".

Since high CTE and density are the biggest drawbacks to the use of the 70 SiO$_2$-18 Al$_2$O$_3$-12 La$_2$O$_3$ "eutectic glass" for flat panel display substrates, it was then mixed with several conventional RO—B$_2$O$_3$—Al$_2$O$_3$—SiO$_2$ glasses that have lower CTE and density and higher viscosity at 1600° C. to get the best of both and achieve a high strain point glass that is easier to melt than conventional RO—B$_2$O$_3$—Al$_2$O$_3$—SiO$_2$ glasses and similar physical properties. This resulted in a particularly preferred glass demonstrating an extremely low liquidus temperature of 1120° C. a high liquidus viscosity of 265,000 Poise with a 754° C. strain point. It is very unusual for a glass with such a high strain point to have a 200 Poise temperature of only 1474° C., which is almost 200° C. cooler than that of commercially available LCD substrate glass such as Eagle 2000 (Corning Incorporated) that exhibits a strain point of only 667° C. Thus the inventive glass has a higher strain point and is easier to melt because of the steeper viscosity curve enabled by the presence of La$_2$O$_3$ as illustrated in FIG. 1.

Glasses 146-189 are more variants on this mixture of oxides to improve properties, but there are many tradeoffs, so one of skill in the art will readily appreciate that the particular application and desired glass characteristics will determine the selection of the optimal composition. For example glasses 191 and 192 show how strain point of 137 increases by partially substituting Y$_2$O$_3$ for La$_2$O$_3$, which also lowers the density and CTE, but at the expense of liquidus temperature.

Table III demonstrates that high strain point glasses may also be achieved in the SiO$_2$—Al$_2$O$_3$—La$_2$O$_3$ system by addition of ZrO$_2$.

The use of ZrO$_2$ as a component to improve melting characteristics of lanthanum, yttrium or other high strain point rare earth aluminosilicate glasses avoids redox problems sometimes associated with the addition of TiO$_2$ and density/cost penalties associated with the use of Ta$_2$O$_5$. The use of ZrO$_2$ as a modifier also has the advantageous effect of increasing strain point. Further such glasses are effectively pre-saturated with Zr and as such will be much less corrosive to zircon based refractory materials that contact the glass during manufacture.

Due to chemical similarity of Hf and Zr, the use of $HfO_2$ or a mixture of $HfO_2$ and $ZrO_2$ would also result in colorless, high strain point glasses.

Figure 2:
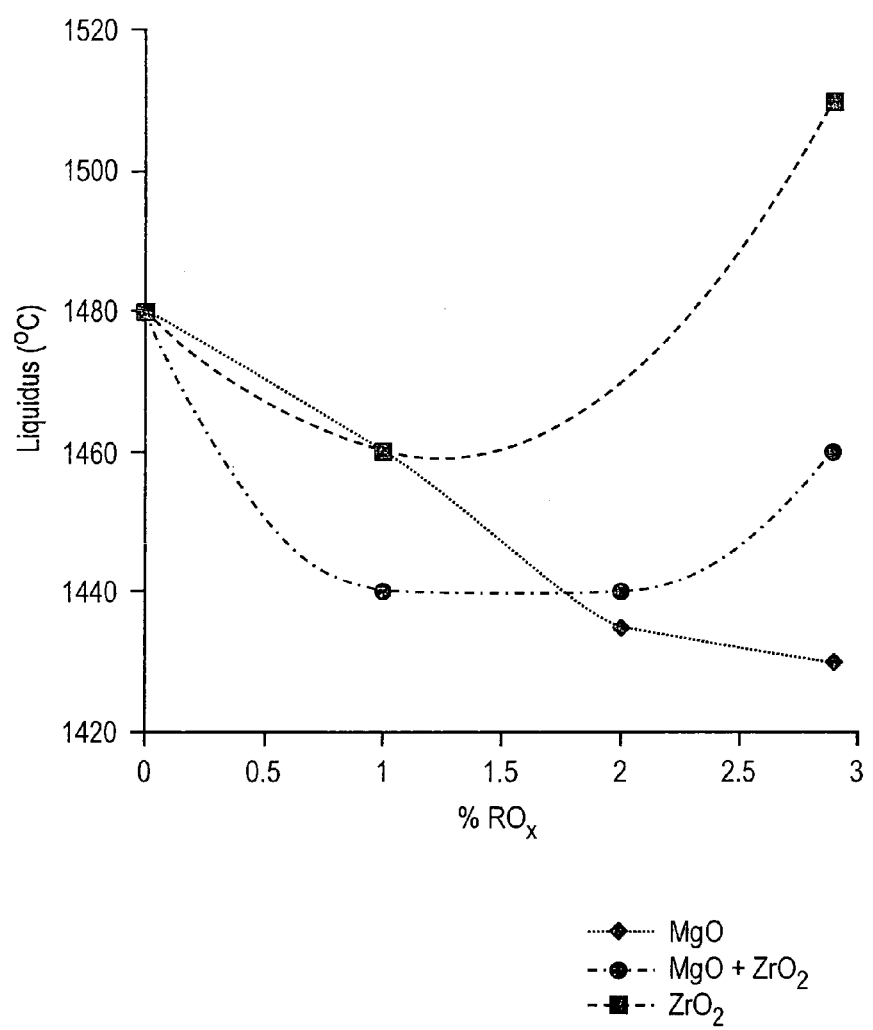
FIG. 2 is a plot that shows variation of strain point, annealing point and CTE as a function of $ZrO_2$ content in glasses of the present invention.

FIG. 2 shows the variation in strain point (Tstr), anneal point (Tann) and CTE as a function of $ZrO_2$ content in LaZr aluminosilicate glasses containing 14 mole % $Al_2O_3$ and 80% $SiO_2$.

Table III demonstrates that additions of MgO, SrO, $SnO_2$ as well as $ZrO_2$ and lanthanum aluminosilicate glasses provide materials with high strain point and, in some cases, CTE that are comparable to that of silicon. The high silica content of these glasses assures a relatively high liquidus temperature, but use of a lower liquidus temperature base glass, such as the "eutectic" glasses previously described (7) would bring the liquidus temperatures more into line with those of commercial LCD substrate glasses such as Corning 1737 and Corning Eagle.

Table IV illustrates two glasses, 227 and 228, which comprise a rare earth ($RE_2O_3$) combination comprising lanthanum and yttrium.

As can be observed from the Tables, not all tests were performed for all compositions.

TABLE I

| Example | $Al_2O_3$ | $B_2O_3$ | CaO | F- | $Gd_2O_3$ | $La_2O_3$ | MgO | $Nb_2O_5$ | $P_2O_5$ | $Sc_2O_3$ | $SiO_2$ | $SnO_2$ | SrO | $Ta_2O_5$ | $TiO_2$ |
|---|---|---|---|---|---|---|---|---|---|---|---|---|---|---|---|
| 1 | 17.99 | | | | | | | | | | 69.98 | | | | |
| 2 | 18.00 | | | | | 1.00 | | | | | 69.98 | | | | |
| 3 | 18.00 | | | | | 3.00 | | | | | 69.98 | | | | |
| 4 | 18.08 | | | | | 6.00 | | | | | 69.98 | | | | |
| 5 | 17.99 | | | | | 9.00 | | | | | 69.98 | | | | |
| 6 | 17.99 | | | | | 11.00 | | | | | 69.98 | | | | |
| 7 | 17.99 | | | | | 12.00 | | | | | 69.98 | | | | |
| 8 | 13.50 | | | | | 4.50 | | | | | 81.97 | | | | |
| 9 | 17.50 | | | | | 12.49 | | | | | 69.98 | | | | |
| 10 | 17.99 | | | | | 10.99 | | | | | 70.98 | | | | |
| 11 | 16.99 | | | | | 12.00 | | | | | 70.98 | | | | |
| 12 | 17.99 | | | | | 10.00 | | | | | 71.98 | | | | |
| 13 | 16.99 | | | | | 11.00 | | | | | 71.98 | | | | |
| 14 | 16.00 | | | | | 12.00 | | | | | 71.97 | | | | |
| 15 | 17.00 | | | | | 10.00 | | | | | 72.98 | | | | |
| 16 | 15.99 | | | | | 11.00 | | | | | 72.98 | | | | |
| 17 | 15.00 | | | | | 11.99 | | | | | 72.97 | | | | |
| 18 | 17.99 | | | | | 10.00 | | | | | 70.97 | | | | |
| 19 | 16.99 | | | | | 11.00 | | | | | 70.98 | | | | |
| 20 | 18.00 | | | | | 8.99 | | | | | 71.98 | | | | |
| 21 | 16.99 | | | | | 10.00 | | | | | 71.98 | | | | |
| 22 | 16.00 | | | | | 10.99 | | | | | 71.98 | | | | |
| 23 | 16.98 | | | | | 12.00 | | | | | 69.98 | | | | |
| 24 | 18.99 | | | | | 11.00 | | | | | 68.98 | | | | |
| 25 | 17.99 | | | | | 12.00 | | | | | 68.98 | | | | |
| 26 | 17.00 | | | | | 13.00 | | | | | 68.97 | | | | |
| 27 | 17.99 | | | | | 8.00 | | | | | 70.98 | | | | |
| 28 | 16.99 | | | | | 9.00 | | | | | 70.98 | | | | |

| Example | $Y_2O_3$ | ZnO | $ZrO_2$ | $Na_2O$ | Strain Pt | Anneal Pt | Soft Point | CTE | Density (g/cc) | Liquidus Temp | Phase | Liq Visc (P) | 200 P Temp (°C.) |
|---|---|---|---|---|---|---|---|---|---|---|---|---|---|
| 1 | 12.00 | | | | 839 | 883 | 1061 | 38.2 | 3.048 | 1460 | Cristobalite | 240 | 1472 |
| 2 | 11.00 | | | | 836 | 880 | 1054 | 38.6 | 3.073 | 1430 | Cristobalite | | |
| 3 | 9.00 | | | | 822 | 868 | 1052 | 39.5 | 3.123 | 1340 | Cristobalite | | |
| 4 | 6.00 | | | | 815 | 861 | 1042 | 39.4 | 3.196 | 1270 | Mullite | 6420 | 1455 |
| 5 | 3.00 | | | | 803 | 851 | 1032 | 40.4 | 3.269 | 1275 | Mullite | | |
| 6 | 1.00 | | | | 800 | 846 | 1028 | 41.8 | 3.329 | 1290 | Mullite | | |
| 7 | | | | | 796 | 843 | 1021 | 43.6 | 3.359 | 1210 | Mullite | 22000 | 1436 |
| 8 | | | | | 835 | 887 | 1121 | 24.8 | 2.710 | 1475 | Mullite | | |
| 9 | | | | | 788 | 835 | 1016 | 44.6 | 3.329 | 1230 | Cristobalite | | |
| 10 | | | | | 794 | 841 | 1027 | 42.2 | 3.282 | 1285 | Mullite | | |
| 11 | | | | | 792 | 838 | 1022 | 45.1 | 3.355 | 1235 | Cristobalite | | |
| 12 | | | | | 797 | 845 | 1030 | 39.5 | 3.201 | 1290 | Mullite | | |
| 13 | | | | | 795 | 841 | 1036 | 42.1 | 3.273 | 1290 | Cristobolite | | |
| 14 | | | | | 791 | 837 | 1018 | 45.0 | 3.346 | 1265 | Cristobolite | | |
| 15 | | | | | 795 | 843 | 1030 | 40.1 | 3.193 | 1305 | Cristobolite | | |
| 16 | | | | | 792 | 840 | 1035 | 42.7 | 3.272 | 1305 | Cristobolite | | |
| 17 | | | | | 790 | 837 | 1020 | 44.5 | 3.345 | 1320 | Cristobolite | | |
| 18 | 1.00 | | | | 795 | 843 | | 41.2 | 3.251 | 1290 | Mullite | | |
| 19 | 1.00 | | | | 791 | 838 | | 43.3 | 3.322 | 1335 | Cristobalite | | |
| 20 | 1.00 | | | | 797 | 845 | | 39.1 | 3.165 | 1335 | Mullite | | |
| 21 | 1.00 | | | | 795 | 842 | | 39.5 | 3.243 | 1355 | Cristobolite | | |
| 22 | 1.00 | | | | 791 | 838 | | 42.4 | 3.316 | 1300 | Cristobolite | | |
| 23 | 1.00 | | | | 802 | 845 | | 42.9 | 3.407 | 1250 | LaSi | | |
| 24 | 1.00 | | | | 806 | 849 | | 43.8 | 3.335 | 1265 | Mullite | | |
| 25 | 1.00 | | | | 807 | 849 | | 44.5 | 3.411 | 1240 | LaSi | | |
| 26 | 1.00 | | | | 803 | 845 | | 46.3 | 3.481 | 1255 | LaSi | | |
| 27 | 3.00 | | | | 817 | 861 | 1045 | 39.3 | 3.199 | 1330 | Mullite | | |

TABLE I-continued

| | | | | | | | | | | | | | | |
|---|---|---|---|---|---|---|---|---|---|---|---|---|---|---|
| 28 | 3.00 | | | | 815 | 858 | 1039 | 40.4 | 3.273 | 1300 | Cristobalite | | | |

| Example | Al₂O₃ | B₂O₃ | CaO | F- | Gd₂O₃ | La₂O₃ | MgO | Nb₂O₅ | P₂O₅ | Sc₂O₃ | SiO₂ | SnO₂ | SrO | Ta₂O₅ |
|---|---|---|---|---|---|---|---|---|---|---|---|---|---|---|
| 29 | 17.99 | | | | | 7.00 | | | | | 71.98 | | | |
| 30 | 16.99 | | | | | 8.00 | | | | | 71.98 | | | |
| 31 | 16.00 | | | | | 9.00 | | | | | 71.98 | | | |
| 32 | 17.00 | | | | | 9.99 | | | | | 69.97 | | | |
| 33 | 18.99 | | | | | 9.00 | | | | | 68.98 | | | |
| 34 | 17.99 | | | | | 10.00 | | | | | 68.97 | | | |
| 35 | 17.00 | | | | | 11.00 | | | | | 68.97 | | | |
| 36 | 17.99 | | | | | 12.00 | | | | | 69.98 | | | |
| 37 | 17.72 | 1.48 | | | | 11.82 | | | | | 68.94 | | | |
| 38 | 17.47 | 2.91 | | | | 11.65 | | | | | 67.93 | | | |
| 39 | 17.90 | | 15.0 | | | 10.94 | | | | | 69.63 | | | |
| 40 | 17.81 | | 2.98 | | | 9.90 | | | | | 69.28 | | | |
| 41 | 16.91 | | 1.48 | | | 9.95 | | | | | 71.62 | | | |
| 42 | 16.82 | | 2.98 | | | 8.91 | | | | | 71.26 | | | |
| 43 | 17.00 | | | | | 12.99 | | | | | 69.97 | | | |
| 44 | 17.99 | | | | | 13.00 | | | | | 68.98 | | | |
| 45 | 17.82 | 0.98 | | | | 11.88 | | | | | 69.29 | | | |
| 46 | 17.64 | 1.96 | | | | 11.76 | | | | | 68.60 | | | |
| 47 | 17.46 | 2.92 | | | | 11.65 | | | | | 67.94 | | | |
| 48 | 17.81 | | | | | 11.88 | | | | | 69.28 | | 0.99 | |
| 49 | 17.64 | | | | | 11.76 | | | | | 68.59 | | 1.96 | |
| 50 | 17.46 | | | | | 11.64 | | | | | 67.92 | | 2.91 | |
| 51 | 16.98 | | | 5.65 | | 11.32 | | | | | 66.03 | | | |
| 52 | 16.06 | | | 10.72 | | 10.71 | | | | | 62.48 | | | |
| 53 | 15.25 | | | 15.25 | | 10.17 | | | | | 59.31 | | | |
| 54 | 18.00 | | | | | 12.00 | | | | | 69.99 | | | |
| 55 | 18.00 | | | | | 11.00 | | | | | | 1.00 | 69.98 | |
| 56 | 17.99 | | | | | 10.00 | | | | | | 2.00 | 69.99 | |
| 57 | 17.82 | | | | | 11.88 | | | | | 69.29 | | | |
| 58 | 17.64 | | | | | 11.76 | | | | | 68.60 | | | |
| 59 | 17.47 | | | | | 11.65 | | | | | 67.94 | | | |
| 60 | 17.82 | | | | | 11.88 | | | | | 69.29 | | | |
| 61 | 17.64 | | | | | 11.76 | | | | | 68.61 | | | |
| 62 | 17.48 | | | | | 11.65 | | | | | 67.94 | | | |
| 63 | 17.82 | | | | 0.99 | 11.88 | | | | | 69.28 | | | |
| 64 | 17.82 | | | | 1.98 | 10.89 | | | | | 69.28 | | | |
| 65 | 17.82 | | | | 2.97 | 9.90 | | | | | 69.28 | | | |
| 66 | 17.81 | | | | | 11.88 | | 0.99 | | | 69.29 | | | |
| 67 | 17.64 | | | | | 11.76 | | 1.96 | | | 68.60 | | | |
| 68 | 17.46 | | | | | 11.65 | | 2.91 | | | 67.94 | | | |
| 69 | 17.81 | | | | | 11.88 | | | | | 69.29 | | | 0.99 |
| 70 | 17.64 | | | | | 11.76 | | | | | 68.60 | | | 1.96 |
| 71 | 17.47 | | | | | 11.64 | | | | | 67.94 | | | 2.91 |
| 72 | 17.81 | | | | | 11.88 | 0.98 | | | | 69.29 | | | |
| 73 | 17.64 | | | | | 11.76 | 1.95 | | | | 68.61 | | | |
| 74 | 17.46 | | | | | 11.65 | 2.91 | | | | 67.94 | | | |
| 75 | 17.81 | | | | | 11.88 | | | | | 69.29 | 0.99 | | |
| 76 | 17.64 | | | | | 11.76 | | | | | 68.60 | 1.96 | | |
| 77 | 17.81 | | | | | 11.88 | | | | 0.99 | 69.29 | | | |
| 78 | 17.64 | | | | | 11.76 | | | | 1.96 | 68.60 | | | |
| 79 | 17.82 | | | | | 11.88 | | | | | 69.28 | | | |
| 80 | 17.64 | | | | | 11.76 | | | | | 68.60 | | | |

| Example | TiO₂ | Y₂O₃ | ZnO | ZrO₂ | Strain Pt | Anneal Pt | Soft Point | CTE | Density (g/cc) | Liquidus Temp | Phase | Liq Visc (P) | 200 P Temp (° C.) |
|---|---|---|---|---|---|---|---|---|---|---|---|---|---|
| 29 | | 3.00 | | | 822 | 866 | 1055 | 38.5 | 3.120 | 1360 | Mullite | | |
| 30 | | 3.00 | | | 815 | 859 | 1047 | 38.4 | 3.193 | 1325 | Cristobalite | | |
| 31 | | 3.00 | | | 811 | 854 | 996 | 43.2 | 3.268 | 1330 | Cristobalite | | |
| 32 | | 3.00 | | | 810 | 852 | 1033 | 42.7 | 3.355 | 1265 | LaSi | | |
| 33 | | 3.00 | | | 812 | 856 | 1034 | 41.0 | 3.288 | 1285 | Mullite | | |
| 34 | | 3.00 | | | 812 | 854 | 1031 | 43.9 | 3.361 | 1255 | LaSi | | |
| 35 | | 3.00 | | | 809 | 851 | 1025 | 47.2 | 3.435 | 1255 | LaSi | | |
| 36 | | | | | 794 | 842 | 1018.5 | 43.0 | 3.357 | 1245 | Mullite | | |
| 37 | | | | | 788 | 835 | 1012.5 | 44.4 | 3.364 | 1225 | LaSi | | |
| 38 | | | | | 785 | 832 | 1006 | 46.2 | 3.372 | 1235 | LaSi | | |
| 39 | | | | | 791 | 839 | 1017.5 | 43.4 | 3.296 | 1240 | Mullite | | |
| 40 | | | | | 789 | 837 | 1020.5 | 42.7 | 3.233 | 1240 | Mullite | | |
| 41 | | | | | 789 | 839 | 1030 | 42.6 | 3.210 | 1265 | Cristobalite | | |
| 42 | | | | | 788 | 837 | 1028 | 41.4 | 3.149 | 1270 | Cristobalite | | |
| 43 | | | | | 793 | 839 | 1016 | 46.7 | 3.438 | 1260 | LaSi | | |
| 44 | | | | | 795 | 841 | 1013.5 | 46.2 | 3.441 | 1265 | LaSi | | |
| 45 | | | | | | | | 42.1 | 3.316 | 1250 | Mullite | | |
| 46 | | | | | | | | 43.2 | 3.321 | 1210 | Mullite | 11725 | 1433 |

TABLE I-continued

| | | | | | | | | | | | | |
|---|---|---|---|---|---|---|---|---|---|---|---|---|
| 47 | | | | | | | 45.9 | 3.321 | 1195 | Mullite | 14000 | 1430 |
| 48 | | | | | | 1010 | 45.4 | 3.379 | 1280 | ? | | |
| 49 | | | | | | 1007 | 45.6 | 3.390 | 1250 | ? | 5300 | 1434 |
| 50 | | | | | | 1005 | 47.0 | 3.411 | 1210 | ? | 13300 | 1433 |
| 51 | | | | | | 979 | 41.8 | 3.355 | 1270 | Mullite | | |
| 52 | | | | | | 958 | 43.0 | 3.348 | 1190 | Mullite | | |
| 53 | | | | | | 940 | 43.0 | 3.342 | 1255 | Mullite | | |
| 54 | | | | | | | | | 1245 | Mullite | | |
| 55 | | | | 807 | 850 | | 42.1 | | 1270 | Mullite | | |
| 56 | | | | 807 | 850 | | 41.6 | | 1300 | Mullite | | |
| 57 | | | 0.99 | 806 | 848 | | 44.5 | | 1245 | Mullite | | |
| 58 | | | 1.96 | 808 | 850 | | 44.7 | | 1360 | mu + zr | | |
| 59 | | | 2.91 | 808 | 849 | | 43.8 | | 1430 | Zr | | |
| 60 | 0.99 | | | 801 | 843 | | 44.5 | | 1240 | Mullite | | |
| 61 | 1.96 | | | 798 | 839 | | 42.9 | | 1250 | Mullite | | |
| 62 | 2.91 | | | 791 | 833 | | 43.6 | | 1250 | Mullite | | |
| 63 | | | | 805 | 847 | 1021 | 44.8 | 3.446 | 1255 | LaSi | | |
| 64 | | | | 808 | 850 | 1026 | 44.9 | 3.467 | 1235 | LaSi | | |
| 65 | | | | 808 | 850 | 1029 | 44.8 | 3.489 | 1240 | LaSi | | |
| 66 | | | | 801 | 842 | 1017 | 43.6 | 3.385 | 1245 | Mullite | | |
| 67 | | | | 793 | 834 | 1004 | 44.6 | 3.410 | 1235 | Mullite | | |
| 68 | | | | 807 | 849 | 998 | 44.6 | 3.432 | 1250 | Cristobalite | | |
| 69 | | | | 806 | 848 | 1029 | 44.5 | 3.452 | 1230 | Mullite | | |
| 70 | | | | 806 | 848 | 1026 | 44.3 | 3.531 | 1250 | cr + mu | | |
| 71 | | | | 805 | 847 | 1023 | 44.0 | 3.616 | 1245 | Cristobalite | | |
| 72 | | | | 796 | 839 | | 43.6 | | 1220 | Mullite | | |
| 73 | | | | 789 | 832 | | 45.5 | 3.363 | 1200 | Mullite | 17800 | 1434 |
| 74 | | | | 784 | 827 | | 44.7 | 3.364 | 1180 | mu + LaSi | 24000 | 1425 |
| 75 | | | | 808 | 850 | | 43.8 | 3.373 | 1340 | Cassiterite | | |
| 76 | | | | 807 | 849 | | 44.1 | 3.387 | 1410 | Cassiterite | | |
| 77 | | | | 805 | 847 | | 43.3 | 3.413 | 1535 | ? | | |
| 78 | | | | 805 | 848 | | 43.3 | | | | | |
| 79 | | 0.99 | | 789 | 833 | | 44.0 | 3.339 | 1220 | Mullite | | |
| 80 | | 1.96 | | 783 | 825 | | 44.3 | 3.377 | 1225 | Mullite | | |

TABLE II

| Example | Al₂O₃ | Al₂N₂ | B₂O₃ | BaO | CaO | La₂O₃ | MgO | SiO₂ | SrO | Y₂O₃ | Strain Pt | Anneal Pt | CTE | Young's Modulus (Mpsi) | Shear Modulus (Mpsi) | Poisson's Ratio | Density (g/cm3) | Liquidus Temperature | Phase | Liq Visc (P) | 200 P Temp (°C.) |
|---|---|---|---|---|---|---|---|---|---|---|---|---|---|---|---|---|---|---|---|---|---|
| 81 | 17.74 | | | | | 12.24 | | 69.98 | | | 799 | 842 | 42.1 | 13.712 | 5.449 | 0.258 | | 1230 | Mullite | | |
| 82 | 17.55 | | | | | 11.64 | 0.76 | 70.02 | | | 795 | 838 | 42.5 | 13.668 | 5.403 | 0.265 | | 1230 | Mullite | | |
| 83 | 17.37 | | | | | 11.02 | 1.51 | 70.06 | | | 791 | 835 | | 13.649 | 5.437 | 0.255 | | 1230 | Mullite | | |
| 84 | 16.99 | | | | | 9.80 | 3.01 | 70.17 | | | 785 | 829 | 41.1 | 13.597 | 5.424 | 0.253 | | 1250 | Cristobalite | | |
| 85 | 16.62 | | | | | 8.58 | 4.50 | 70.27 | | | 781 | 826 | | 13.589 | 5.445 | 0.248 | | 1275 | Mullite | | |
| 86 | 17.34 | | | | | 11.63 | 1.51 | 69.48 | | | 790 | 833 | 42.9 | 13.838 | 5.495 | 0.259 | | 1200 | Cristobalite | | |
| 87 | 16.97 | | | | | 11.03 | 3.00 | 68.97 | | | 782 | 826 | 43.5 | 13.745 | 5.468 | 0.257 | | 1210 | Cristobalite | | |
| 88 | 16.19 | | | | | 9.80 | 6.01 | 67.97 | | | 771 | 814 | 42.9 | 14.019 | 5.575 | 0.257 | | 1215 | Cristobalite | | |
| 89 | 15.42 | | | | | 8.58 | 8.99 | 66.96 | | | 761 | 805 | 43.0 | 13.889 | 5.522 | 0.258 | | 1240 | La₂Si₂O₇ | | |
| 90 | 17.74 | | | | 0.02 | 12.24 | | 69.98 | | | 805 | 847 | 44.0 | 13.779 | 5.455 | 0.263 | | 1215 | La₂Si₂O₇ | 15600 | 1436 |
| 91 | 17.48 | | | | 0.58 | 11.63 | | 70.27 | | | 802 | 844 | 43.6 | 13.686 | 5.42 | 0.262 | | 1200 | Cristobalite | | |
| 92 | 17.24 | | | | 1.14 | 11.02 | | 70.57 | | | 800 | 843 | 43.3 | 13.651 | 5.406 | 0.263 | | 1215 | Cristobalite | 19500 | 1455 |
| 93 | 16.71 | | | | 2.27 | 9.80 | | 71.19 | | | 800 | 843 | 42.2 | 13.399 | 5.314 | 0.261 | | 1235 | Cristobalite | | |
| 94 | 16.20 | | | | 3.42 | 8.57 | | 71.77 | | | 796 | 841 | 41.8 | 13.141 | 5.291 | 0.242 | | 1240 | Mullite | 21000 | 1502 |
| 95 | 17.30 | | | | 1.30 | 11.64 | | 69.73 | | | 799 | 841 | 43.9 | 13.648 | 5.432 | 0.261 | | 1210 | La₂Si₂O₇ | | |
| 96 | 16.87 | | | | 2.59 | 11.03 | | 69.48 | | | 798 | 840 | 45.2 | 13.632 | 5.4 | 0.256 | | 1240 | La₂Si₂O₇ | | |
| 97 | 15.98 | | | | 5.20 | 9.79 | | 68.94 | | | 791 | 834 | 46.3 | 13.495 | 5.352 | 0.262 | | 1245 | La₂Si₂O₇ | | |
| 98 | 15.12 | | | | 7.80 | 8.57 | | 68.43 | | | 785 | 827 | 47.3 | 13.328 | 5.303 | 0.261 | | 1255 | La₂Si₂O₇ | | |
| 99 | 17.35 | | | 0.01 | | 11.64 | 0.02 | 70.47 | 0.50 | | 806 | 848 | 42.7 | 13.462 | 5.398 | 0.257 | | 1235 | Cristobalite | | |
| 100 | 16.97 | | | 0.01 | | 11.02 | 0.02 | 70.96 | 1.00 | | 805 | 847 | 41.7 | 13.462 | 5.355 | 0.268 | | 1230 | Cristobalite | | |
| 101 | 16.19 | | | 0.01 | | 9.80 | | 71.97 | 2.00 | | 804 | 847 | | 13.261 | 5.294 | 0.252 | | 1270 | Cristobalite | | |
| 102 | 15.42 | | | 0.02 | | 8.58 | | 72.94 | 3.00 | | 804 | 849 | 41.3 | 12.997 | 5.21 | 0.247 | | 1290 | Cristobalite | | |
| 103 | 13.86 | | | 0.04 | | 6.12 | | 74.93 | 4.99 | | 805 | 852 | | 12.509 | 5.076 | 0.232 | | 1335 | Cristobalite | | |
| 104 | 17.25 | | | 0.01 | | 11.64 | | 69.92 | 1.15 | | 802 | 845 | | 13.644 | 5.43 | 0.263 | | 1235 | La₂Si₂O₇ | | |
| 105 | 16.77 | | | 0.02 | | 11.02 | | 69.85 | 2.30 | | 801 | 843 | | 13.482 | 5.368 | 0.256 | | 1260 | La₂Si₂O₇ | | |
| 106 | 15.78 | | | 0.03 | | 9.79 | | 69.75 | 4.60 | | 798 | 841 | | 13.211 | 5.258 | 0.256 | | 1280 | La₂Si₂O₇ | | |
| 107 | 14.82 | | | 0.05 | | 8.57 | | 69.62 | 6.89 | | 795 | 838 | | 12.974 | 5.192 | 0.249 | | 1335 | SrAlSi₂O₈ | | |
| 108 | 18.99 | | | | | 12.00 | | 68.97 | | | | | 42.9 | 13.778 | 5.472 | 0.259 | | 1265 | Mullite | | |
| 109 | 17.36 | | | 0.45 | | 11.64 | | 70.51 | 0.01 | | | | 44.8 | 13.481 | 5.379 | 0.253 | | 1195 | Cristobalite | | |
| 110 | 16.98 | | | 0.90 | | 11.03 | | 71.03 | 0.02 | | | | 43.4 | 13.385 | 5.329 | 0.256 | | 1210 | Cristobalite | | |
| 111 | 16.22 | | | 1.80 | | 9.81 | | 72.09 | 0.04 | | | | 43.0 | 13.095 | 5.25 | 0.247 | | 1245 | Cristobalite | | |
| 112 | 15.46 | | | 2.70 | | 8.59 | | 73.13 | 0.05 | | | | 42.3 | 12.865 | 5.153 | 0.248 | | 1250 | Cristobalite | | |
| 113 | 17.18 | | | 0.96 | | 11.63 | | 70.17 | 0.02 | | | | 45.8 | 12.824 | 5.1 | 0.257 | | 1245 | La₂Si₂O₇ | | |
| 114 | 16.64 | | | 1.92 | | 11.02 | | 70.35 | 0.04 | | | | 45.9 | 13.251 | 5.295 | 0.251 | | 1245 | La₂Si₂O₇ | | |
| 115 | 15.52 | | | 3.83 | | 9.78 | | 70.72 | 0.08 | | | | 45.3 | 12.92 | 5.163 | 0.251 | | 1300 | La₂Si₂O₇ | | |
| 116 | 14.41 | | | 5.75 | | 8.56 | | 71.08 | 0.12 | | | | 46.3 | 12.637 | 5.036 | 0.255 | | 1355 | La₂Si₂O₇ | | |
| 117 | 18.00 | 0.00 | | | | 11.00 | | 70.00 | 3.00 | | 810 | 850 | 49.5 | | | | | | Mullite | | |
| 118 | 14.00 | 2.60 | | | | 11.00 | | 70.00 | 3.00 | | 826 | 868 | 45.0 | | | | | | | | |
| 119 | 17.31 | | | | | 11.53 | 3.84 | 67.29 | | | 782 | 824 | 43.6 | | | | 3.378 | 1210 | La₂Si₂O₇ | | |
| 120 | 17.17 | | | | | 11.42 | 4.77 | 66.64 | | | 776 | 819 | 45.3 | | | | 3.381 | 1205 | La₂Si₂O₇ | | |
| 121 | 16.98 | | 3.84 | | | 11.53 | 5.65 | 66.02 | | | 754 | 802 | 44.5 | | | | 3.383 | 1205 | La₂Si₂O₇ | | |
| 122 | 17.30 | | 4.76 | | | 11.42 | | 67.29 | | | 756 | 802 | 43.0 | | | | 3.294 | 1295 | Cristobalite | | |
| 123 | 17.13 | | 5.66 | | | 11.53 | | 66.65 | | | 747 | 792 | 42.3 | | | | 3.273 | 1225 | Cristobalite | | |
| 124 | 16.97 | | | | | 11.42 | | 66.01 | | | 739 | 784 | 42.8 | | | | 3.26 | 1255 | Cristobalite | | |
| 125 | 17.30 | | | | | 11.54 | 2.88 | 68.25 | | | 784 | 827 | 43.8 | | | | 3.363 | 1190 | La₂Si₂O₇ | | |
| 126 | 17.14 | | | | | 11.42 | 2.87 | 68.54 | | | 783 | 827 | 43.8 | | | | 3.353 | 1200 | La₂Si₂O₇ | | |
| 127 | 16.97 | | | | | 11.32 | 2.83 | 68.85 | | | | | | | | | | 1200 | Cristobalite | | |

TABLE II-continued

| Example | Al₂O₃ | Al₂N₂ | B₂O₃ | BaO | CaO | La₂O₃ | MgO | SiO₂ | SrO | Y₂O₃ | Strain Pt | Anneal Pt | CTE | Young's Modulus (Mpsi) | Shear Modulus (Mpsi) | Poisson's Ratio | Density (g/cm3) | Liquidus Temperature | Liquidus Phase | Liq Visc (P) | 200 P Temp (° C.) |
|---|---|---|---|---|---|---|---|---|---|---|---|---|---|---|---|---|---|---|---|---|---|
| 128 | 16.97 | | 2.83 | | | 11.32 | 2.84 | 66.01 | | | 756 | 801 | 44.0 | | | | 3.326 | 1240 | Cristobalite | | |
| 129 | 16.66 | | 2.78 | | | 11.11 | 2.77 | 66.65 | | | 755 | 799 | 43.5 | | | | 3.302 | 1220 | Cristobalite | | |
| 130 | 16.35 | | 2.73 | | | 10.90 | 2.73 | 67.25 | | | 756 | 801 | 43.7 | | | | | 1270 | Cristobalite | | |
| 131 | 16.06 | | 2.67 | | | 10.71 | 2.69 | 67.83 | | | 756 | 801 | 42.8 | | | | 3.267 | 1250 | Cristobalite | | |
| 132 | 17.39 | | | | | 11.60 | | 70.98 | | | 804 | 847 | 43.3 | | | | 3.326 | 1245 | Cristobalite | | |
| 133 | 17.14 | | 3.81 | | | 11.42 | | 67.59 | | | 758 | 803 | 42.7 | | | | 3.287 | 1230 | Cristobalite | | |
| 134 | 16.97 | | 3.77 | | | 11.32 | | 67.91 | | | 757 | 802 | 42.9 | | | | 3.284 | 1285 | Cristobalite | | |
| 135 | 16.81 | | 3.75 | | | 11.21 | | 68.20 | | | 759 | 804 | 42.4 | | | | 3.268 | 1270 | Cristobalite | | |
| 136 | 16.50 | | 3.66 | | | 11.01 | | 68.79 | | | 761 | 806 | | | | | 3.258 | 1270 | Cristobalite | | |
| 137 | 15.66 | | 3.10 | 1.72 | 2.05 | 7.21 | 0.98 | 68.74 | 0.50 | | 754 | 802 | 39.6 | | | | 3.071 | 1120 | Cristobalite | 265000 | 1474 |
| 138 | 14.49 | | 4.63 | 2.58 | 3.07 | 4.80 | 1.48 | 68.11 | 0.76 | | 730 | 779 | 38.6 | | | | 2.914 | 1185 | Cristobalite | | |
| 139 | 13.32 | | 6.19 | 3.45 | 4.11 | 2.40 | 1.97 | 67.48 | 1.01 | | 707 | 757 | 37.3 | | | | 2.742 | 1165 | Cristobalite | | |
| 140 | 12.14 | | 7.73 | 4.31 | 5.14 | | 2.46 | 66.87 | 1.27 | | 685 | 738 | 37.0 | | | | 2.551 | 1115 | Cristobalite | | |
| 141 | 16.45 | | 2.39 | 0.41 | 0.92 | 9.54 | 0.09 | 69.57 | 0.41 | 0.20 | 771 | 817 | 40.1 | | | | 3.194 | 1340 | Cristobalite | | |
| 142 | 14.93 | | 4.74 | 0.81 | 1.82 | 7.11 | 0.19 | 69.13 | 0.81 | 0.39 | 745 | 792 | 38.8 | | | | 3.031 | 1230 | Cristobalite | | |
| 143 | 13.43 | | 7.07 | 1.20 | 2.71 | 4.71 | 0.30 | 68.72 | 1.21 | 0.59 | 719 | 768 | 37.2 | | | | 2.856 | 1220 | Cristobalite | | |
| 144 | 11.95 | | 9.37 | 1.59 | 3.59 | 2.34 | 0.39 | 68.32 | 1.60 | 0.78 | 692 | 742 | 35.5 | | | | 2.665 | 1215 | Cristobalite | | |
| 145 | 10.48 | | 11.64 | 1.98 | 4.47 | | 0.50 | 67.90 | 1.99 | 0.97 | 663 | 715 | 33.5 | | | | 2.474 | 1100 | Cristobalite | | |
| 146 | 11.48 | | | 5.98 | 5.49 | | 0.02 | 76.48 | 0.12 | | 816 | 872 | 37.4 | | | | 2.538 | 1460 | Cristobalite | | |
| 147 | 11.37 | | | 5.93 | 5.43 | 0.99 | 0.02 | 76.07 | 0.11 | | 791 | 845 | 39.5 | | | | 2.698 | 1355 | Cristobalite | | |
| 148 | 11.25 | | | 5.87 | 5.38 | 1.96 | 0.02 | 75.31 | 0.12 | | 781 | 833 | 42.0 | | | | 2.789 | 1395 | Cristobalite | | |
| 149 | 11.14 | | | 5.81 | 5.32 | 2.91 | 0.02 | 74.60 | 0.11 | | 776 | 826 | 44.1 | | | | 2.866 | 1405 | Cristobalite | | |
| 150 | 11.31 | | | 4.42 | 5.41 | 2.95 | 0.02 | 75.72 | 0.09 | | 785 | 836 | 41.3 | | | | 2.819 | 1350 | Cristobalite | | |
| 151 | 16.69 | | | 1.20 | 1.10 | 9.59 | | 71.35 | 0.03 | | 801 | 846 | 42.5 | | | | 3.223 | 1255 | Cristobalite | | |
| 152 | 15.38 | | | 2.40 | 2.19 | 7.19 | | 72.73 | 0.05 | | 799 | 846 | 41.3 | | | | 3.079 | 1285 | Cristobalite | | |
| 153 | 14.08 | | | 3.59 | 3.30 | 4.79 | | 74.09 | 0.07 | | 798 | 847 | 41.1 | | | | 2.927 | 1335 | Cristobalite | | |
| 154 | 12.77 | | | 4.79 | 4.39 | 2.40 | 0.02 | 75.46 | 0.10 | | 800 | 852 | 38.5 | | | | 2.780 | 1400 | Cristobalite | | |
| 155 | 18.29 | | | | | 12.19 | | 69.48 | | | 804 | 847 | 44.8 | 13.74 | 5.496 | 0.256 | 3.361 | 1275 | Mullite | 3600 | 1436 |
| 156 | 17.24 | | | | 1.14 | 11.02 | | 70.57 | | | 801 | 845 | 43.7 | 13.83 | 5.498 | 0.257 | 3.298 | 1235 | Cristobalite | 1600 | 1455 |
| 157 | 16.20 | | | | 3.42 | 8.57 | | 71.77 | | | 799 | 844 | 40.9 | 13.79 | 5.494 | 0.255 | 3.122 | 1305 | Cristobalite | | 1502 |
| 158 | 15.68 | | | | 4.55 | 7.34 | | 72.35 | | | 797 | 844 | 39.5 | 13.64 | 5.423 | 0.257 | 3.039 | 1290 | Cristobalite | | 1531 |
| 159 | | | | 1.00 | | 11.02 | | 70.95 | 0.02 | | 802 | 847 | 43.4 | 13.54 | 5.398 | 0.254 | 3.314 | 1270 | Cristobalite | | 1466 |
| 160 | 16.99 | | | 0.50 | 0.50 | 11.00 | | 70.97 | 0.01 | | 802 | 846 | 43.1 | 13.52 | 5.384 | 0.256 | 3.301 | 1245 | Cristobalite | 10100 | 1461 |
| 161 | 17.91 | | | | | 10.94 | 1.48 | 69.63 | | | 794 | 838 | 42.7 | 13.64 | 5.39 | 0.265 | 3.294 | 1295 | Mullite | | |
| 162 | 17.81 | | | | | 9.90 | 2.96 | 69.30 | | | 786 | 831 | 42.3 | 13.49 | 5.352 | 0.261 | 3.235 | 1300 | Mullite | | |
| 163 | 17.73 | | | | | 8.87 | 4.43 | 68.94 | | | 781 | 826 | 40.5 | 13.35 | 5.305 | 0.258 | 3.171 | 1250 | Mullite | | |
| 164 | 17.90 | | | | 1.50 | 10.94 | | 69.63 | | | 800 | 844 | 44.3 | 13.58 | 5.381 | 0.262 | 3.229 | 1235 | Mullite | | |
| 165 | 17.81 | | | | 2.98 | 9.90 | | 69.28 | | | 797 | 841 | 43.4 | 13.53 | 5.362 | 0.262 | 3.235 | 1220 | Mullite | | |
| 166 | 17.72 | | | | 4.44 | 8.86 | | 68.92 | | | 795 | 840 | 43.1 | 13.52 | 5.356 | 0.262 | 3.170 | | Mullite | | |
| 167 | 17.90 | | | 0.01 | | 10.94 | | 69.26 | 1.49 | | 800 | 844 | 43.6 | 13.64 | 5.397 | 0.259 | 3.318 | 1270 | SrAlSi₂O₈ | | |
| 168 | 17.82 | | | 0.02 | | 9.90 | | 68.90 | 2.97 | | 801 | 845 | 44.4 | 13.49 | 5.352 | 0.261 | 3.275 | 1250 | SrAlSi₂O₈ | | |
| 169 | 17.72 | | | 0.03 | | 8.86 | | 68.24 | 4.43 | | 800 | 845 | 45.1 | 13.35 | 5.305 | 0.258 | 3.224 | 1290 | SrAlSi₂O₈ | | |
| 170 | 17.30 | | | | | 11.54 | | 68.24 | 2.88 | | 800 | 843 | 46.8 | 13.58 | 5.381 | 0.262 | 3.406 | 1260 | La₂Si₂O₇ | | |
| 171 | 17.14 | | | | | 11.43 | | 68.54 | 2.85 | | 800 | 843 | 47.4 | 13.53 | 5.362 | 0.262 | 3.395 | 1265 | La₂Si₂O₇ | | |
| 172 | 16.98 | | | | | 11.32 | | 68.83 | 2.83 | | 800 | 844 | 47.1 | 13.52 | 5.356 | 0.262 | 3.379 | 1270 | La₂Si₂O₇ | | |
| 173 | 17.82 | | | 0.99 | | 11.88 | | 69.28 | | | 803 | 846 | 45.5 | 13.59 | 5.397 | 0.259 | 3.389 | 1225 | La₂Si₂O₇ | | |
| 174 | 17.64 | | | 1.96 | | 11.76 | | 68.60 | | | 802 | 846 | 46.1 | 13.61 | 5.346 | 0.273 | 3.412 | 1310 | La₂Si₂O₇ | | |
| 175 | 17.46 | | | 2.91 | | 11.64 | | 67.92 | | | 802 | 845 | 47.8 | 13.5 | 5.326 | 0.268 | 3.441 | 1270 | La₂Si₂O₇ | | |

TABLE II-continued

| Example | Al$_2$O$_3$ | Al$_2$N$_2$ | B$_2$O$_3$ | BaO | CaO | La$_2$O$_3$ | MgO | SiO$_2$ | SrO | Y$_2$O$_3$ | Strain Pt | Anneal Pt | CTE | Young's Modulus (Mpsi) | Shear Modulus (Mpsi) | Poisson's Ratio | Density (g/cm3) | Liquidus Temperature | Liquidus Phase | Liq Visc (P) | 200 P Temp (°C) |
|---|---|---|---|---|---|---|---|---|---|---|---|---|---|---|---|---|---|---|---|---|---|
| 176 | 17.90 | | | 1.49 | | 10.94 | | 69.63 | | | 805 | 849 | 44.4 | 13.55 | 5.35 | 0.266 | 3.334 | 1235 | La$_2$Si$_2$O$_7$ | | |
| 177 | 17.81 | | | 2.97 | | 9.89 | | 69.26 | | | 806 | 850 | 43.4 | 13.23 | 5.271 | 0.255 | 3.304 | 1215 | La$_2$Si$_2$O$_7$ | | |
| 178 | 17.72 | | | 4.43 | | 8.86 | | 68.92 | | | 806 | 851 | 45.6 | 13.1 | 5.198 | 0.26 | 3.287 | 1325 | BaAlSi$_2$O$_8$ | | |
| 179 | 16.57 | | 1.96 | | 1.82 | 9.96 | 0.04 | 69.53 | 0.11 | | 776 | 882 | 42.6 | | | | 3.210 | 1255 | Cristobalite | | |
| 180 | 15.09 | | 3.91 | | 3.65 | 7.48 | 0.08 | 69.57 | 0.22 | | 754 | 801 | 37.7 | | | | 3.014 | 1260 | Cristobalite | | |
| 181 | 13.60 | | 5.88 | | 5.48 | 4.99 | 0.13 | 69.60 | 0.32 | | 732 | 779 | 37.4 | | | | 2.814 | 1260 | Cristobalite | | |
| 182 | 12.11 | | 7.84 | | 7.31 | 2.49 | 0.17 | 69.64 | 0.43 | | 714 | 763 | 35.7 | | | | 2.598 | 1205 | Cristobalite | | |
| 183 | 11.37 | | 8.82 | | 8.23 | 1.25 | 0.19 | 69.65 | 0.49 | | 701 | 751 | 33.2 | | | | 2.486 | 1205 | Cristobalite | | |
| 184 | 10.63 | | 9.80 | | 9.14 | | 0.21 | 69.67 | 0.54 | | 688 | 742 | 32.9 | | | | 2.369 | 1210 | Cristobalite | | |
| 185 | 18.05 | | | | | 12.45 | | 69.50 | | | 806 | 848 | 44.0 | | | | 3.402 | 1225 | La$_2$Si$_2$O$_7$ | | |
| 186 | 15.42 | | 3.41 | 1.73 | 2.09 | 7.48 | 0.52 | 68.83 | 0.52 | | 750 | 798 | 42.2 | | | | 3.078 | 1205 | Cristobalite | | |
| 187 | 14.10 | | 5.13 | 2.59 | 3.14 | 4.99 | 0.78 | 68.49 | 0.78 | | 726 | 777 | 39.1 | | | | 2.911 | 1200 | Cristobalite | | |
| 188 | 12.78 | | 6.84 | 3.46 | 4.19 | 2.50 | 1.04 | 68.16 | 1.04 | | 704 | 754 | 39.5 | | | | 2.727 | 1200 | Cristobalite | | |
| 189 | 12.12 | | 7.70 | 3.90 | 4.72 | 1.25 | 1.17 | 67.99 | 1.17 | | 688 | 741 | 38.1 | | | | 2.639 | 1160 | Cristobalite | | |
| 190 | 11.45 | | 8.56 | 4.33 | 5.24 | | 1.30 | 67.82 | 1.30 | | 676 | 730 | 38.2 | | | | 2.549 | 1120 | Cristobalite | | |
| 191 | 15.65 | | 3.09 | 1.72 | 2.05 | 6.20 | 0.98 | 68.70 | 0.50 | 1.00 | 760 | 808 | 40.7 | | | | 3.129 | 1355 | Mullite | | |
| 192 | 15.65 | | 3.09 | 1.72 | 2.05 | 5.20 | 0.98 | 68.70 | 0.50 | 2.00 | 773 | 819 | 39.9 | | | | 2.772 | 1245 | Cristobalite | | |
| 193 | 16.62 | | 3.16 | 1.81 | 2.16 | 7.53 | 1.07 | 67.13 | 0.52 | | 752 | 799 | 41.3 | | | | 3.076 | 1160 | Mullite | 77500 | 1474 |
| 194 | 17.65 | | | 2.94 | | 9.80 | | 69.61 | | | 803 | 848 | 44.5 | | | | 3.286 | 1185 | La$_2$Si$_2$O$_7$ | 62700 | 1473 |

TABLE III

| Example | La$_2$O$_3$ | Al$_2$O$_3$ | SiO$_2$ | MgO | ZrO$_2$ | SnO$_2$ | SrO | HfO$_2$ | Yb$_2$O$_3$ | T$_{str}$ (°C.) | T$_{ann}$ (°C.) | α (ppm/°C.) | CTE | Liq. Temp. |
|---|---|---|---|---|---|---|---|---|---|---|---|---|---|---|
| 195 | 5 | 13 | 80 | | 2 | | | — | — | 846 | 895 | 2.82 | | |
| 196 | 5 | 14 | 80 | | 1 | | | — | — | 836 | 882 | 2.88 | | |
| 197 | 4 | 14 | 80 | | 2 | | | — | — | 849 | 893 | 2.66 | | |
| 198 | 3 | 14 | 80 | | 3 | | | — | — | 880 | 945 | 2.36 | | |
| 199 | 3 | 13 | 80 | | 4 | | | — | — | 872 | 938 | 2.21 | | |
| 200 | 4 | 12 | 82 | | 2 | | | — | — | 855 | 898 | 2.57 | | |
| 201 | 3 | 13 | 82 | | 2 | | | — | — | 883 | 953 | 2.27 | | |
| 202 | 3 | 12 | 82 | | 3 | | | — | — | 882 | 954 | 2.39 | | |
| 203 | 4.19 | 13.3 | 80 | | — | | | 2.2 | 0.25 | 852 | 898 | 2.61 | | |
| 204 | 6 | 13 | 80 | 1 | | | | | | 811 | | | 29.6 | |
| 205 | 5 | 13 | 80 | 2 | | | | | | 815 | | | 25.4 | |
| 206 | 4 | 13 | 80 | 3 | | | | | | 823 | | | 27.1 | |
| 207 | 5 | 14 | 80 | 1 | | | | | | 819 | | | 26.8 | |
| 208 | 4 | 14 | 80 | 2 | | | | | | 823 | | | 25.7 | |
| 209 | 3 | 14 | 80 | 3 | | | | | | 831 | | | 22.1 | |
| 210 | 3 | 14 | 80 | 1.5 | 1.5 | | | | | 837 | | | 24.9 | |
| 211 | 6 | 13 | 80 | | | 1 | | | | 838 | | | 29.9 | |
| 212 | 5 | 14 | 80 | | | 1 | | | | 828 | | | 28.1 | |
| 213 | 6 | 13 | 80 | | | | 1 | | | 814 | | | 30.8 | |
| 214 | 5 | 13 | 80 | | | | 2 | | | 811 | | | 29.6 | |
| 215 | 4 | 13 | 80 | | | | 3 | | | 809 | | | 29.3 | |
| 216 | 5 | 14 | 80 | | | | 1 | | | 820 | | | 27.6 | |
| 217 | 4 | 14 | 80 | | | | 2 | | | 815 | | | 27.3 | |
| 218 | 3 | 14 | 80 | | | | 3 | | | 818 | | | 26.0 | |
| 219 | 5.9 | 13.9 | 79.2 | 1 | | | | | | 828 | | | 29.2 | 1460 |
| 220 | 5.9 | 13.7 | 78.4 | 2 | | | | | | 808 | | | 33.4 | 1435 |
| 221 | 5.8 | 13.6 | 77.7 | 2.9 | | | | | | 791 | | | 33.2 | 1430 |
| 222 | 5.9 | 13.9 | 79.2 | 0.5 | 0.5 | | | | | 833 | | | 32.4 | 1440 |
| 223 | 5.9 | 13.7 | 78.4 | 1 | 1 | | | | | 838 | | | 31.5 | 1440 |
| 224 | 5.8 | 13.6 | 77.7 | 1.45 | 1.45 | | | | | 823 | | | 32.6 | 1460 |
| 225 | 5.9 | 13.9 | 79.2 | | 1 | | | | | 827 | | | 33.1 | 1460 |
| 226 | 5.8 | 13.6 | 77.7 | | 2.9 | | | | | 833 | | | 31.7 | 1510 |

TABLE IV

| Example | La$_2$O$_3$ | Al$_2$O$_3$ | SiO$_2$ | Na$_2$O | Y$_2$O$_3$ | SrO | T$_{str}$ (°C.) |
|---|---|---|---|---|---|---|---|
| 227 | 3.0 | 14 | 80 | 0.5 | 3.0 | — | 840 |
| 228 | 2.75 | 14 | 80 | — | 2.75 | 1.0 | 836 |

While the invention has been described with respect to a limited number of embodiments, those skilled in the art, having benefit of this disclosure, will appreciate that other embodiments can be devised which do not depart from the scope of the invention disclosed herein. The scope of the invention is defined by the attached claims.

We claim:

1. A substrate for a flat panel display device comprising a rare earth aluminosilicate glass exhibiting a strain point greater than approximately 650° C., a liquidus temperature less than approximately 1300° C., the glass comprising the following composition when calculated in mole percent and calculated from the batch on an oxide basis:

60-75% SiO$_2$ 10.6-20% Al$_2$O$_3$ 2-15% RE$_2$O$_3$ the RE being a rare earth selected from group consisting of Sc, Y, La, Ce, Pr, Nd, Sm, Eu, Gd, Tb, Dy, Ho, Er, Tm, Yb, Lu and mixtures thereof; and 1-12% of one or more RO, wherein R is an alkaline earth metal selected from the group consisting of Mg, Ca, Sr, or any combination thereof; or when R is Ba, at least one additional alkaline earth metal selected from the group consisting of Mg, Ca, and Sr is present;

0-9% B$_2$O$_3$; and 0-2% SnO$_2$, wherein the composition does not contain TiO$_2$ and Ta$_2$O$_5$ either individually or in any combination thereof.

2. The substrate of claim 1 wherein said substrate comprises the following composition when calculated in mole percent and calculated from the batch on an oxide basis:

65-75% SiO$_2$ 10.6-20% Al$_2$O$_3$ 4-15% RE$_2$O$_3$.

3. The substrate of claim 1 having a strain point of at least 650° C.

4. The substrate of claim 1 wherein the substrate comprises, in mole percent and calculated from the batch on an oxide basis, 2-15% La$_2$O$_3$.

5. The substrate of claim 1 having a liquidus temperature of no greater than 1300° C.

6. The substrate of claim 1 having a liquidus viscosity greater than 10,000 poise.

7. A rare earth aluminosilicate glass exhibiting a strain point greater than approximately 650° C., a liquidus temperature less than approximately 1300° C., the glass comprising the following composition as calculated in a mole percent on an oxide basis:

65-75% SiO$_2$ 10.6-20% Al$_2$O$_3$ 2-15% RE$_2$O$_3$ the RE being a rare earth selected from the group consisting of Sc, Y, La, Ce, Pr, Nd, Sm, Eu, Gd, Tb, Dy, Ho, Er, Tm, Yb, Lu, and mixtures thereof; and 1-12% of one or more RO, wherein R is an alkaline earth metal selected from the group consisting of Mg, Ca, r, or any combination thereof; or when R is Ba, at least one additional alkaline earth metal selected from the group consisting of Mg, Ca, and Sr is presented;

0-9% $B_2O_3$; and 0-2% $SnO_2$, wherein the composition does not contain $TiO_2$ and $Ta_2O_5$ either individually or in any combination thereof.

8. The glass of claim 7 further exhibiting a liquidus viscosity of greater than 10,000 poise.

9. The glass of claim 7 further exhibiting a 200 Poise temperature that is less than 1550° C.

10. The glass of claim 7, wherein the glass is a substrate present in an electronic device.

11. The glass of claim 10 wherein the electronic device is an LCD display.

12. The glass of claim 7, wherein Re is La.

13. The glass of claim 7, wherein RE is La, and the amount of $La_2O_3$ is from 2-12.49% in mole percent as calculated from the batch on an oxide basis.

14. The glass of claim 7, wherein the amount of RO is about 7-12% mole percent as calculated from the batch on an oxide basis.

15. The glass of claim 7, wherein the amount of RO is about 10-12% mole percent as calculated from the batch on an oxide basis.

16. The glass of claim 7, wherein the amount of $B_2O_3$ is about 0-3% mole percent as calculated from the batch on an oxide basis.

17. The glass of claim 7, wherein the glass has a coefficient of thermal expansion (0-300° C.) of $25-50 \times 10^{-7}$/° C.

18. The glass of claim 7, wherein the glass has liquidus temperature less than 1250° C.

19. The glass of claim 7, further comprising a ratio $(RO+1.5*RE_2O_3)/Al_2O_3$ wherein the ratio is between 0.85 and 1.2.

20. A rare earth aluminosilicate glass exhibiting a strain point greater than approximately 650° C., a liquidus temperature less than approximately 1300° C., the glass consisting of the following composition as calculated in a mole percent on an oxide basis:

60-75% $SiO_2$ 10-20% $Al_2O_3$ 2-12.49% $RE_2O_3$ the RE being a rare earth selected from the group consisting of Sc, Y, La, Ce, Pr, Nd, Sm, Eu, Gd, Tb, Dy, Ho, Er, Tm, Yb, Lu, and mixtures thereof; and 1-12% of one or more RO, wherein R is an alkaline earth metal selected from the group consisting of Mg, Ca, and Sr; or when R is Ba, at least one additional alkaline earth metal, selected from the group consisting of Mg, Ca, and Sr is present;

0-9% $B_2O_3$; and 0-2% $SnO_2$.

21. The glass of claim 20, wherein the glass is a substrate present in an electronic device.

22. The glass of claim 21, wherein the electronic device is an LCD display.

23. The lass of claim 20, further comprising a 200 Poise temperature that is less than 1550° C.

* * * * *

UNITED STATES PATENT AND TRADEMARK OFFICE
CERTIFICATE OF CORRECTION

PATENT NO. : 7,612,004 B2 Page 1 of 1
APPLICATION NO. : 11/505205
DATED : November 3, 2009
INVENTOR(S) : Bruce Gardiner Aitken et al.

It is certified that error appears in the above-identified patent and that said Letters Patent is hereby corrected as shown below:

| Col. | Line | |
|---|---|---|
| 3 | 36 | After "resistance of" please add --the-- |
| 4 | 21 | Please delete "then" and add --than-- |
| 4 | 26 | After "SnO$_2$" please add --Li$_2$O-- |
| 21 | 5 | Please delete "Ca, r," and add --Ca, Sr,-- |
| 21 | 8 | Please delete "presented" and add --present-- |
| 22 | 31 | Please delete "lass" and add --glass-- |

Signed and Sealed this

Thirty-first Day of August, 2010

David J. Kappos
*Director of the United States Patent and Trademark Office*